United States Patent
Agrawal et al.

(10) Patent No.: US 8,699,516 B2
(45) Date of Patent: Apr. 15, 2014

(54) METHOD AND APPARATUS FOR S.I.P./H.323 INTERWORKING

(75) Inventors: Hemant Agrawal, Mathura (IN);
Radhika R. Roy, Howell, NJ (US);
Vipin Palawat, Lowell, MA (US)

(73) Assignee: AT&T Intellectual Property II, L.P.,
Atlanta, GA (US)

( * ) Notice: Subject to any disclaimer, the term of this patent is extended or adjusted under 35 U.S.C. 154(b) by 212 days.

(21) Appl. No.: 13/082,895

(22) Filed: Apr. 8, 2011

(65) Prior Publication Data

US 2011/0191486 A1 Aug. 4, 2011

Related U.S. Application Data

(63) Continuation of application No. 11/228,673, filed on Sep. 16, 2005, now Pat. No. 7,953,111, which is a continuation of application No. 09/825,304, filed on Apr. 4, 2001, now Pat. No. 7,002,989.

(60) Provisional application No. 60/195,937, filed on Apr. 10, 2000.

(51) Int. Cl.
*H04J 3/16* (2006.01)
*H04J 3/22* (2006.01)

(52) U.S. Cl.
USPC ........................................................ 370/466

(58) Field of Classification Search
None
See application file for complete search history.

(56) References Cited

U.S. PATENT DOCUMENTS 5,812,639 A 9/1998 Bartholomew et al.
6,359,896 B1 3/2002 Baker et al.

(Continued)

FOREIGN PATENT DOCUMENTS

EP 1143683 10/2001
WO 00/33550 6/2000

OTHER PUBLICATIONS

Singh et al., "Interworking Between SIP/SDP and H.323", IETF, Jan. 10, 2000.

(Continued)

*Primary Examiner* — Ayaz Sheikh
*Assistant Examiner* — Blanche Wong
(74) *Attorney, Agent, or Firm* — Akerman LLP; Michael K. Dixon; Roy P. Zachariah

(57) ABSTRACT

An interworking function (IWF) for a first and second protocol based network, for example, an H.323 protocol based network and an SIP protocol based network comprises an interworking gateway server including a state machine for defining each call processing state and a translation table for use in translating addresses formatted in each protocol. A method of interworking for use in interworking between said first protocol based network and said second protocol based network comprises the steps of receiving at said interworking gateway server serving said first and second protocol based networks a request from an endpoint in the first or second protocol based networks, establishing a state machine in memory whereby, for each state of said state machine, a message associated with that state is categorized as one of a triggering message, a non-triggering message and an error message, establishing a translation table in said memory whereby an address formatted in said first protocol has a one-for-one correspondence with an address formatted in said second protocol, processing said request in accordance with said translation table and said state machine and permitting communication between said first and second endpoints utilizing a realtime transport protocol. In the event media is terminated at said interworking gateway server, the interworking gateway server, in one embodiment, comprises a media switching fabric for switching media terminated at the gateway to an addressed endpoint capable of receiving it.

14 Claims, 4 Drawing Sheets

(56) References Cited

U.S. PATENT DOCUMENTS

| | | | |
|---|---|---|---|
| 6,584,093 B1 | 6/2003 | Salama et al. | |
| 6,636,596 B1 | 10/2003 | Gallant et al. | |
| 6,650,632 B1 * | 11/2003 | Volftsun et al. | 370/352 |
| 6,697,377 B1 * | 2/2004 | Ju et al. | 370/466 |
| 6,738,390 B1 | 5/2004 | Xu et al. | |
| 6,885,658 B1 | 4/2005 | Ress et al. | |
| 7,113,504 B1 * | 9/2006 | Volftsun et al. | 370/352 |
| 7,457,290 B1 * | 11/2008 | Salama et al. | 370/392 |
| 7,492,775 B2 * | 2/2009 | Cannon et al. | 370/401 |
| 7,596,131 B1 * | 9/2009 | Volftsun et al. | 370/352 |
| 7,852,789 B2 * | 12/2010 | Satterlee et al. | 370/255 |
| 2001/0046234 A1 | 11/2001 | Agrawal et al. | |
| 2002/0120760 A1 | 8/2002 | Kimchi et al. | |
| 2003/0119500 A1 | 6/2003 | Mukherjee et al. | |

OTHER PUBLICATIONS

M. Handley, H. Schulzrinne, E. Schooler, and J. Rosenberg, "SIP: Session Initiation Protocol", RFC 2543, IETF, Mar. 1999.

M. Handley, V. Jacobson, "SDP: Session Descrition Protocol", RFC 2322, IETF, Apr. 1998.

S. Bradner, "Key words for use in RFCs to indicate requirement levels", RFC 2119, IETF, Mar. 1997.

"Packet based multimedia communications systems", ITU-T Recommendation H.323, Geneva, Switzerland, Feb. 1998.

Singh K., Schulzrinne H.: "Interworking Between SIP/SDP and H.323" IETF Internet-Draft, Jan. 2000, pp. 1-39, XP002189117.

Sihgh K., Schulzrinne: "Internetworking Between SIP/SDP and H.323" Proceedings of 1.sup.st IP-Telephony Workshop IPTEL 2000, Apr. 12-13, 2000, Berlin.

Huitema C et al: "An Architecture for Residential Internet Telephony Service" IEEE Network, IEEE Inc. New York, US vol. 13, No. 3, May 1999, pp. 50-56, XP000870631, ISSN: 0890-8044.

PCT Search Report dated Feb. 4, 2002, regarding International Application No. PCT/US01/11451.

Singh, Kundan, et al.: "Interworking Between SIP/SDP and H.323," IETF Internet-Draft (XP002189117), pp. 1-39, Jan. 2000.

Singh, Kundan, et al., "Interworking Between SIP/SDP and H.323," (XP002189118) Proceedings of the 1st Internet Telephony Workshop (IPTEL), Berlin, Apr. 12-13, 2000.

Huitema, Christian, et al.: "An Architecture for Residential Internet Telephony Service," (XP000870631), IEEE Network, vol. 13, No. 3, May/Jun. 1999.

* cited by examiner

*Fig. 1*

| HIGH-LEVEL COMPARISON H.323 AND SIP | | |
|---|---|---|
| FUNCTIONALITY | H.323 | SIP |
| THIRD PARTY CALL CONTROL | YES | NO |
| CAPABILITY EXCHANGE | YES & BETTER | YES |
| ADMISSION CONTROL | YES | NO |
| POLICY CONTROL | YES | NO |
| RESOURCE RESERVATION | YES | NO |
| COMPLEXITY | MORE | LESS |
| EXTENSIBILITY OF RESERVATION | VENDOR SPECIFIED | YES, IANA |
| EASE OF CUSTOMIZATION | HARDER | EASIER |
| VERSION COMPATIBILITY | YES | UNKNOWN |
| PSTN SIGNALING INTERPRETABILITY | BETTER | WORSE |
| PROTOCOL ENCODING | BINARY | TEXT |

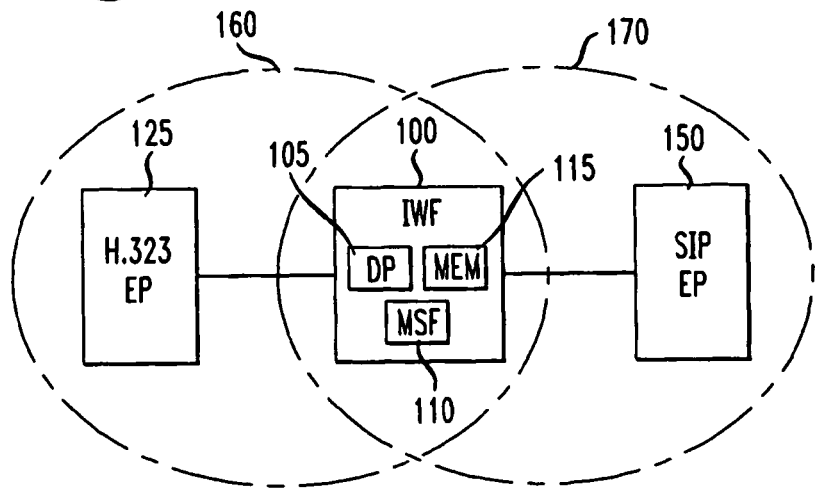

*Fig. 2*

METHOD AND APPARATUS FOR S.I.P./H.323 INTERWORKING

CROSS-REFERENCE TO RELATED APPLICATIONS

This is a continuation of U.S. application Ser. No. 11/228,673, filed Sep. 16, 2005, which is a continuation of U.S. application Ser. No. 09/825,304, filed Apr. 4, 2001, now U.S. Pat. No. 7,002,989, which claims the benefit of U.S. Provisional Application Ser. No. 60/195,937, filed Apr. 10, 2000, all of which are incorporated herein by reference in their entirety.

BACKGROUND

1. Technical Field

The present invention relates to the field of telecommunications systems in which more than one protocol is being followed and, more particularly, to such a method and apparatus for use in such telecommunication systems supporting interworking between the Internet telephone protocol: H.323—Packet-Based Multimedia Communications Systems and the Session Initiation Protocol (SIP).

2. Related Art

The International Telecommunications Union (ITU) is an organization of the United Nations promoting the uniform provision of telecommunications services throughout the world. In furtherance of this goal and in particular, the ITU-T section issued H.323 version 1 in 1996 to describe a protocol for Internet protocol telephony applications. Meanwhile, a Session Initiation Protocol (SIP), different from H.323, has been developed since 1999 via the Internet Engineering Task Force (IETF) to also support Internet protocol telephony applications but arising from a different perspective.

In U.S. patent application Ser. Nos. 09/642,142, 09/642,279 and 09/642,298, filed Aug. 18, 2000, by Radhika R. Roy and incorporated herein by reference as to their entire contents, there is shown in the Figures and described a real-time mobility protocol, architecture and intelligent signaling scheme for computer-readable medium for real-time mobile multimedia communications and conferencing over packet-based networks. In those applications, the concept of inter-working between an H.323 protocol-based network and a Session Initiation Protocol (SIP)-based network is introduced but not described in any detail. In U.S. patent application Ser. No. 09/801,914, filed Mar. 9, 2001, by Radhika R. Roy, entitled "H.323 Back-end Services for Mobility Management" and incorporated herein by reference as to its entire contents, there are described back-end services supporting mobility management.

Referring to FIG. 1, there is provided a high level comparison of H.323 and SIP showing some of the similarities and many of the differences between the two protocols. The differences result in a problem in defining how interworking, although necessary, results in difficulties to resolve. For example, not shown in FIG. 1, it may be suggested that SIP, as it has developed from a different perspective, relates more to the provision of public and free services while H.323 has evolved from the private network side and interests in financial profit. Perhaps, such a comment is not perfectly descriptive, but it may be seen from FIG. 1, that H.323, for example, is better suitable for exchange, for admission control, for policy control, for reservation of resources, encourages version compatibility and is binary-based. SIP, on the other hand, is based on text and is less complex a protocol than H.323. Consequently, there is a need, for example, to translate an address that may be in one protocol to an address based in the other protocol. Command codes and messages, too, may not have a one-for-one correspondence between one protocol and another. Nevertheless, a user utilizing an H.323 IP telephony device trying to communicate with another user utilizing an SIP-based IP telephony device or vice versa will have a need to communicate by first requesting service and then achieving a data connection to the addressed party in as efficient a manner as possible. The requested service may comprise multimedia data transfers alone or as a supplement to a conventional IP telephony voice connection.

Singh et al., in their document "Interworking Between SIP/SDP and H.323" lodged Jan. 10, 2000 with the Internet Engineering Task Force and incorporated herein by reference as to its entire contents, describe a fundamental call scenario including user registration and address resolution and call establishment. They also describe address conversion in some detail whereby, for example, text-based addresses such as kns10@columbia.edu are converted to 128.59.19.194 and the like. Also, an algorithm for finding an intersection in capability sets for handling media in terminals and users agents is described. Handling of Q.931 and H.245 messages is also described, and a detailed description of an interworking gateway behavior is provided. The document which may not comprise prior art to the present invention fails to describe, for example, how to classify messages for developing a state machine at the gateway or providing a media switching fabric for any media terminated at the gateway.

Consequently, there remains a need in the art to provide an interworking function including a state machine for inter-working between two dissimilar IP telephony protocols so that users of each protocol will be able to communicate with one another.

SUMMARY OF THE INVENTION

The present invention relates to defining requirements for an SIP-H.323 Interworking function (IWF) and provides a conceptual basis for a method and apparatus for accomplishing such interworking. The IWF is a functional entity that typically is comprised of one or more network servers accessible by either a user in an SIP network or an H.323 network for receiving service requests and processing such requests to achieve a working connection between terminal devices based on the different protocols without the devices themselves having to be modified for compliance with the other protocol. The one or more servers thus comprise a gateway converging the ITU-T H.323 and IETF SIP.

A number of definitions will be used consistently herein as follows:

An H.323 gatekeeper (GK) is an optional component in an H.323 network. If it is present, it must perform the functions of address translation, bandwidth control, admission control and zone management.

An InterWorking Function (IWF) according to the present invention comprises a gateway server facilitating an inter-working between an H.323 and a SIP protocol based system.

An SIP Server can be either an SIP proxy or an SIP redirect server as defined by the SIP protocol.

An endpoint is an entity from which media, as defined below, originates or finally terminates. This endpoint can either be an H.323 terminal or an SIP user agent.

A media switching fabric (MSF) will be a logical entity present in the IWF, according to the present invention which will perform the task of switching of media (e.g., audio, video, and/or data) traffic over the real-time transport protocol (RTP) from one logical port to other.

A method of interworking via a state machine for use in interworking between an H.323-based network and a session initiation protocol (SIP)-based network comprises the steps of receiving signaling messages at an interworking server including a data processor and a memory for storing the state machine that requires translation of signaling messages between H.323 and SIP. For example, the IWF server will set up a request from an H.323 endpoint, transmitting a corresponding invite message to an addressed SIP endpoint, receiving a ringing response message from the SIP endpoint, transmitting a corresponding alert message to the H.323 endpoint, receiving an OK message from the SIP endpoint, transmitting a connect message to the H.323 endpoint, negotiating said connect message utilizing an H.245 protocol and transmitting an ACK message to the SIP endpoint and communicating between the H.323 endpoint and the SIP endpoint utilizing realtime transport protocol (RTP) using the state machine as a guide. For each state, messages and events are characterized as triggering, non-triggering or error. However, an IWF may also include media switching function (IWF), if needed, to switch media (e.g., audio, video, and/or data) traffic terminated at IWF and carried over RTP between the H.323 and the SIP side.

A method of interworking via a state machine for use in interworking between a session initiation protocol (SIP)-based network and an H.323-based network comprises the steps of receiving at an interworking server an invite message from an SIP endpoint and transmitting a corresponding setup message to an addressed H.323 endpoint, receiving an alerting message from the H.323 endpoint and transmitting a corresponding ringing message to the SIP endpoint, receiving a connect request message and an H.245 protocol message and transmitting an OK message to the SIP endpoint, receiving an ACK message and communicating between the SIP endpoint and the H.323 endpoint utilizing realtime transport protocol.

Other features of a state machine including translation of SIP and H.323 endpoint addresses will become clear from reading the following detailed description of the invention when read in conjunction with the drawings.

BRIEF DESCRIPTION OF THE DRAWINGS

FIG. 1 is an overview drawing providing a high-level comparison between the H.323 protocol and the SIP protocol.

FIG. 2 provides an overall architectural view of a simple end-to-end connection of an H.323 and an SIP Endpoint (EP).

DETAILED DESCRIPTION OF THE INVENTION

Figure 3:
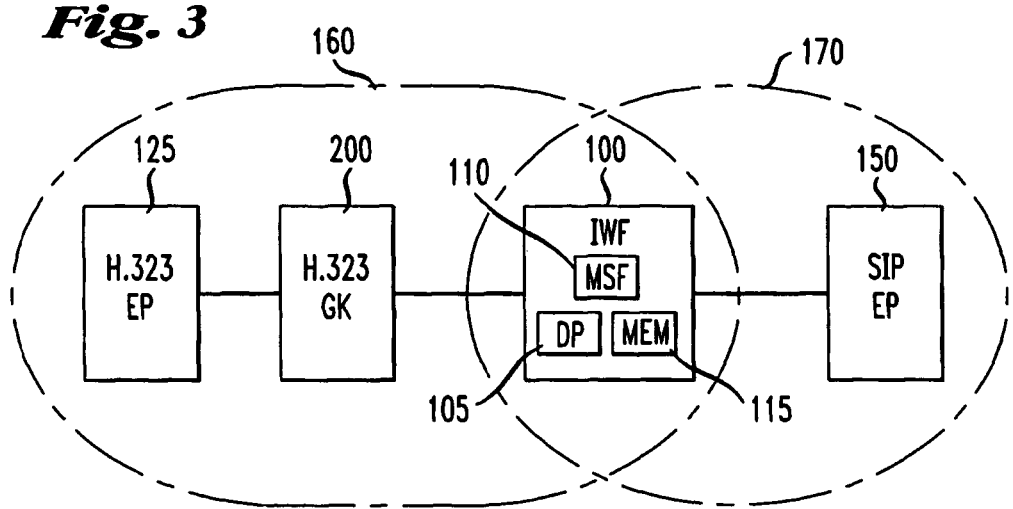
FIG. 3 shows the architectural overview of FIG. 2 but includes an H.323 Gatekeeper function which is optionally available.

The functionality within an interworking function (IWF) between a first and a different protocol will now be described with reference to the figures in which reference numerals will be used to consistently describe similar elements. The differences between SIP and H.323 have already been described with reference to FIG. 1.

Referring to FIG. 2, an interworking function which may most conveniently comprise a gateway server is shown as IWF 100 comprising a media switching fabric 110 in the event variable media is involved, for example, video, graphics, data, encoded voice, facsimile and the like, that may require switching. The functional requirements of an SIP-H.323 interworking function 100, in particular, necessitate close scrutiny of communications processing in each protocol and accommodating any differences, for example, in addressing and command coding. To this end, the gateway server of IWF 100 may further comprise a data processor 105 and memory 115 for, for example, call processing programs including address and command translation programs and databases for storing address translation data. In particular, as will be further described herein, a state machine is provided in gateway memory whereby, for each state of call processing, an event or message is defined as triggering, non-triggering or an error message and "triggering" further may require the definition of an action and the next state of the state machine. External access for IWF 100 should be assumed in FIGS. 2-5 for querying external databases and servers (not shown) in order to accomplish interworking.

Figure 4:
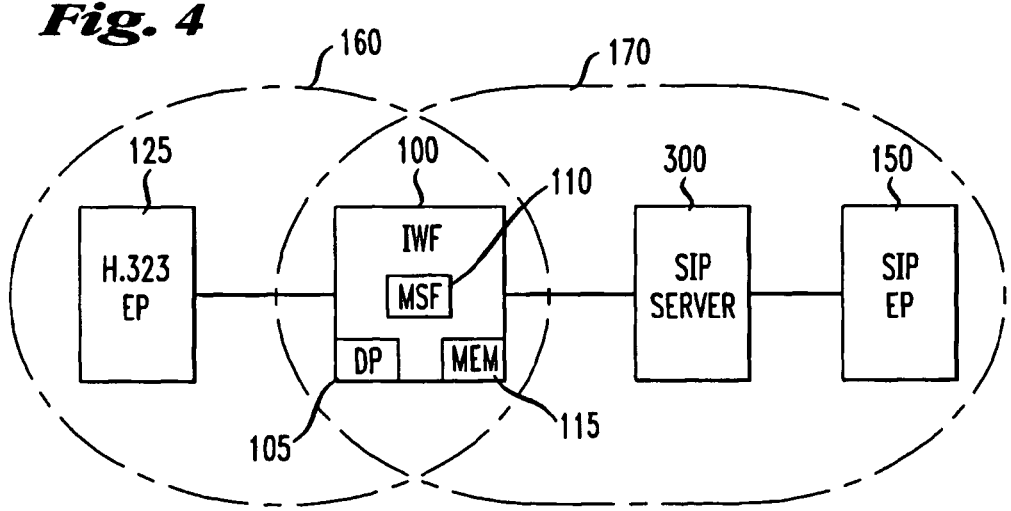
FIG. 4 shows the architectural overview of FIG. 2 but includes an SIP server.
Figure 5:
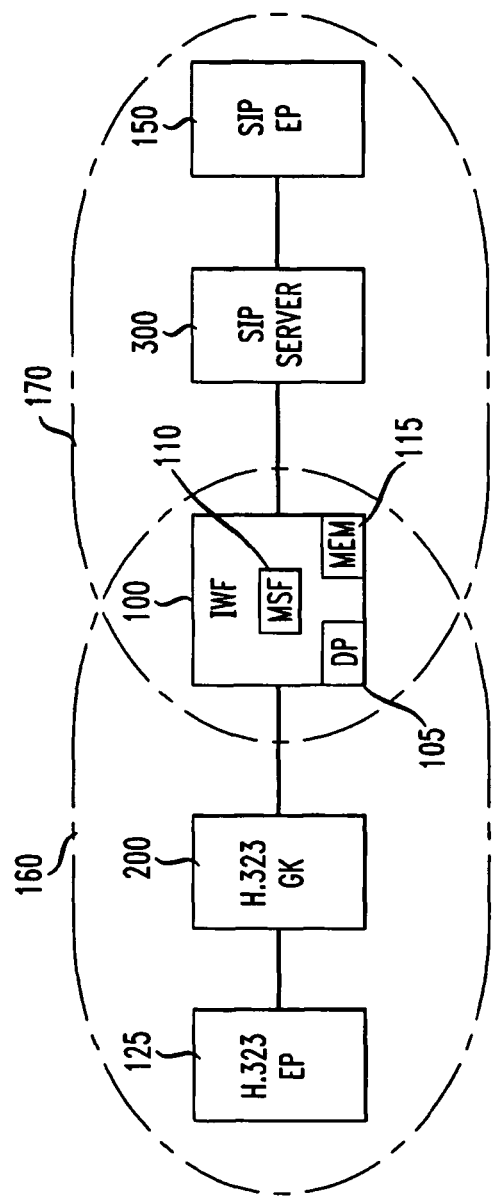
FIG. 5 shows the architectural overview of FIG. 2 but includes both an H.323 Gatekeeper function and an SIP server which may be available.

Referring to FIGS. 3-5, there are shown variations on a simplified architecture of FIG. 2. FIG. 2, as already described, shows simply an H.323 Endpoint 125 being coupled to an SIP Endpoint 150 via IWF 100 where the IWF functionality may be considered to be included either within H.323 network 160 or SIP network 170 or, as not shown, a stand-alone functionality while FIGS. 3-5 assume one or more of an H.323 gatekeeper 200 or SIP server 300 are present.

It is clear that an interworking function (IWF) for two different protocols such as H.323 and SIP can be architectured in various ways. An exemplary architecture may include the coexistence of H.323 Gatekeeper (GK) 200 with IWF 100 (FIG. 3) or SIP servers 300 (FIG. 4) with IWF 100 or both H.323 GK 200 and SIP server 300 may be present with IWF 100 (FIG. 5). The location of the H.323 GK 200 and/or SIP server 300 in conjunction with the IWF 100 is a matter of implementation and not a protocol issue. There will be no assumptions made for the optional elements and components present in either H.323 or SIP networks. The solution provided here will work for a minimum configuration required for both the protocols. Below will be described recommendations for other configurations, which may include other optional components.

For instance, H.323 Gatekeeper 200 is not a mandatory component of an H.323 network 160. So, there will be no assumptions made for the basic interworking which involves H.323 Gatekeeper 200. For example, in FIG. 3, H.323 Gatekeeper function 200 may be either co-located with IWF 200 or may exist separately in an H.323 zone in which the H.323 entity 125, which may be mobile, resides.

The introduction of IWF redundancy in the network may be desirable. For example, it may be desirable to have plural IWF 100 in a geographic region in the event of failure of one or another or geographically dispersed IWF may cover for one another in the event of a failure of one or the other.

In view of the requirements of providing such an IWF gateway functionality, an IWF 100, in whatever architecture is available among the architectures of FIGS. 2-5, the IWF 100 is assumed to contain the following functions: a) Call sequence mapping (for example, message/command mapping); b) Address translation and resolution (SIP to H.323 and vice versa); c) Terminal Capability transactions (for example, endpoint terminal capabilities to handle various media); d) Opening and closing of media channels; e) Mapping of media codecs for H.323 and SIP network; f) Resource reservation and release; g) Ability to provide the state of resources (resource busy/idle state tables and the like); h) Call state machine (what the IWF 100 should do when it finds itself in a given state); and i) Out of band signal processing, among others.

It is preferable that there be no processing on the media data at IWF 100. It is assumed that both H.323 network 160 and SIP network 170 use the realtime transport protocol (RTP) as a transport for carrying media between endpoints. In most of the cases, RTP will be utilized directly between the endpoints 125, 150 as will be discussed in connection with FIGS. 6 and 7 and steps 690 and 790 respectively. Even if the media from one or the other endpoint 125, 150 is terminated at IWF 100 in a special scenario, the assumption is made that this media will be simply switched to another selected endpoint by a media switching fabric 110 present in the IWF 100.

The inclusion of Network Management for IWF 100 may be left to the H.323 network and/or SIP network management functions separately present with organizational control delegated to the network first requiring a given network management operation.

Pre-Call Requirements include determining the location of an entity desiring service among other requirements. For example, in Mr. Roy's prior pending U.S. patent application Ser. No. 09/801,914, entitled "H.323 Back-end Services for Mobility Management," filed Mar. 9, 2001, back-end services are described for an H.323 network.

The IWF function 100 shall have, a table of reference in its memory for look up to resolve the corresponding H.323 and SIP addresses to IP addresses. This look-up table can either be accomplished by using the capabilities of H.323 Gatekeeper 200 and/or SIP server 300. In one embodiment, the memory table may be stored locally at IWF 100 and periodically updated by H.323 network 160 and SIP network 170. Since H.323 Gatekeeper 200 and SIP server 300 are not mandatory components of the H.323 and SIP systems of FIGS. 2-5 respectively, the IWF function 100 may keep the table of information for address resolution within itself, which, in another embodiment, can be updated by the IWF function 100 by querying the H.323 Gatekeeper 200, SIP server 300 or any other database external to the IWF 100.

Registration with H.323 Gatekeeper 200 by H.323 entity 125 is discussed in Mr. Roy's earlier applications. Registration is performed for an SIP network 170 also, for example, to give the information about SIP side extensions of IWF 100 to H.323 Gatekeeper 200 if it is present in the network. This information will be used by H.323 Gatekeeper 200 to direct a call whose destination is in the SIP network 170. The registration information may be updated at any time to the H.323 Gatekeeper 200, for example, periodically by SIP network 170.

IWF 100 can preferably register with one H.323 Gatekeeper 200 only. The ability to register with multiple H.323 GK gatekeepers by one IWF 100 may be desirable in some situations, for example, when the gatekeepers serve multiple domains or in the redundancy situation alluded to above.

Registration with SIP server 300 also must be accomplished for the H.323 side of the architecture. This registration is done to give information about H.323 side extensions of the IWF 100 to the SIP server 300 if it is present in the SIP network 170. This information will be used by the SIP server 300 to direct a call whose destination is in H.323 network 160. The way in which IWF 100 gets the information of H.323 side extensions may be periodic update by the H.323 gatekeeper if available or may be initiated by the IWF 100 or by the H.323 Gatekeeper 200, if present. IWF 100 may preferably register with one SIP server 300 only. However, IWF 100 may register with more than one SIP server 300, for example, when the SIP server 300 serves different endpoints or when redundancy is provided.

Resource Management is the management and allocation of, for example, ports, addresses, and bandwidth for conveying data packets. Resources for a call also include the memory requirements, (in addition to the processing time slot), logical ports and other call-related data within the IWF 100. Resources in the IWF 100 are to be managed with respect to resource reservation and resource control functions of the gateway server. This resource reservation is done for both signaling and media switching fabric 110 on a per-call basis depending on call requirements which may involve multiple media and multiple endpoint signaling.

Resource Allocation and Reservation is performed as well by IWF 100. The IWF shall: support reservation of logical ports for signaling and media switching fabric 110 for use by a particular call and support their subsequent release (which may be implicit or explicit); allow release in a single exchange of message (minimizing any negotiation) of all resources associated with a particular call; support release of resources if IWF 100 detects that the call is no longer active; and support the reservation and release of resources for opening, reopening, changing and closing of media channels during the call.

The IWF may support the reservation by priority based on the order of capability descriptors and support the reporting of resource reservation and connection completion.

Resource control is another important function of IWF 100. The IWF 100 shall support the pre-reservations for a particular call. These reservations can be made before a call appears at IWF 100. The IWF 100 shall also support the restrictions that can be imposed on a particular endpoint for the use of resources; support the pre-reservation of resources for a particular endpoint; support the reporting out of resources; support the denial of additional resources required during a call for opening, reopening, closing and changing of sessions, and provide support for forced release of the resources associated with a call.

There are also what may be called General Interworking Requirements of IWF 100. The IWF gateway 100 shall use, for example, the H.323 Version 2.0 and SIP Version 2.0 and be forward version compatible. The IWF gateway 100 should handle all mandatory features of H.323 Version 2 as well as SIP Version 2.0 and should also provide backward compatibility for earlier versions. In the future, an augmentation of the IWF capabilities will also support for interworking with other versions, for example versions 2, 3, 4, 5, etc. of H.323 and SIP.

The IWF 100 will provide for the seamless interworking of the two protocols. By seamless is intended a smooth interworking, invisible to the user of either the H.323 terminal device or SIP terminal device at endpoints 125 and 150 respectively. The functioning of IWF 100 should not involve any modification to the H.323 and SIP protocols but may involve specific profiles of these protocols.

There are a number of objectives in defining performance requirements for IWF 100. These include but are not limited to the following: 1) Minimizing the message exchange between IWF 100 and either an H.323 network 160 or SIP network 170 apparatus; 2) Establishing a predetermined recommended maximum processing delay at IWF 100 (the delay figure will be dependent on the expected round-trip message delays and the amount of message exchange); 3) Establishing guidelines for peak calling time (busy periods for various media); and 4) Establishing default settings so that transactions will only be for a change to default parameters or for setting non-default parameters.

IWF 100 should support certain basic call requirements such as resolution of different addresses and address formats for H.323 and SIP endpoints. In this regard, the IWF 100 shall support all the addressing schemes of both the H.323 and SIP protocols. The IWF 100, for example, shall register itself to each of an H.323 Gatekeeper 200 and SIP server 300 either directly or via some indirect method as appropriate, if they are present in the respective networks 160 and 170. For example, as described in the previous location, an H.323 Gatekeeper 200 maintains H.323 mobile entity address, location and identification data or is capable of obtaining such information from related databases. The IWF 100 can facilitate address translation by maintaining a look up table for resolving the addresses because, for example, address resolution is required when an H.323 endpoint requests connection to an SIP endpoint or vice versa. The look-up table of IWF 100 may be updated periodically or upon query by the IWF 100 from the H.323 GK 200 and SIP server 300. The IWF 100 may alternatively use Lightweight Directory Access Protocol (LDAP) or X.500—Directory Protocol (ITU-T) for keeping the address resolution information or use Domain Name System (DNS) for address resolution.

When a call occurs utilizing an H.323 GK 200 per FIG. 3, the IWF 100 shall resolve addresses with the help of H.323 GK 200 when it is present in the network 160. Moreover, the IWF 100 shall register itself to forward the SIP extensions supported on the SIP network 170 side of the IWF 100. At this time, and until redundancy is supported, it shall not be necessary for IWF 100 to register with two different H.323 Gatekeepers 200. Most conveniently, the IWF 100 may update any newly added SIP extensions of SIP network 170 to H.323 Gatekeeper 200.

When a call occurs utilizing an SIP server 300 per FIG. 4, the IWF 100 shall resolve addresses with the help of SIP server 300 if it is present in the network 170. Moreover, the IWF 100 shall register itself with SIP server 300 to forward any H.323 extensions supported on the H.323 network 160 side of IWF 100. At this time and until redundancy is supported and in order to reach all SIP endpoints 150, the IWF 100 may register with many SIP servers 300 and update any newly added H.323 extensions to SIP server(s) 300.

When a call occurs utilizing both an H.323 GK 200 and one or more SIP servers 300 as per FIG. 5, all the requirements defined above when only one or the other of an H.323 gatekeeper 200 (FIG. 3) or one or more SIP servers 300 (FIG. 4) will be met for this case as well.

Due to inherent capability differences between apparatus of an H.323 network 160 and SIP network 170, IWF 100 must support capability negotiation.

Consequently, the IWF 100 shall not make any assumptions for the capabilities of either an SIP user agent or an H.323 terminal at endpoints 125, 150. However, IWF 100 may indicate a default capability of an H.323 terminal or SIP user agent even before doing capability exchange with H.323 (for example, using H.245—Control Protocol for multimedia communication) and SIP (for example, using Session Description Protocol [SDP]). This default capability includes the mandatory capability requirements as defined by the respective protocols. For example, G.711 (ITU-T) coding is mandatory for higher bandwidth networks 160 within H.323. The IWF 100 shall pass on all the capability descriptors of H.323 and SDP from SIP in the maximum possible way to each other. The algorithm for finding out the maximum mapping of capability descriptors with the corresponding SDP is left for further discussion. Moreover, the IWF 100 shall provide mapping for common audio/video formats supported in H.323 with the Realtime Transport Protocol with Audio/Video Profile (RTP/AVP) formats.

To know the capabilities of an SIP entity, the IWF 100 may use an OPTIONS message and may use SDP for capability negotiations on the SIP side, while H.245 may be used to know the capabilities as well as for capability negotiation on the H.323 side. However, the capability discovery and negotiations by the IWF 100 can be done in a transport-independent way that can be applicable for any transport network such as Internet Protocol (IP), Asynchronous Transfer Mode (ATM), and other networks. Moreover, the IWF 100 may support re-negotiation of codec and other resource assignments, if needed.

The IWF 100 also supports the opening and closing of logical channels. Toward this objective, the IWF 100 shall open (and close) the channels between the endpoints 125, 150 only wherever possible. If it is not possible to do so between the endpoints 125, 150, then a given channel can be opened at the media switching fabric 110 of IWF 100. Moreover, the IWF 100 shall support unidirectional, symmetric bi-directional, and asymmetric bi-directional opening of channels so endpoints may be added or dropped, for example, for unidirectional traffic or conferencing applications. The IWF 100 may respond to the mode request and/or to the request for reopening and changing an existing logical channel and support the flow control of H.323.

The IWF 100 also supports and handles media transmission and reception. By media is intended to include at least the information content of an information delivery from one endpoint to another. Toward this objective, the IWF 100 shall not process RTP data going in and out from media switching fabric 110, but rather shall leave any RTP data processing to respective networks 160 and 170. As will be seen from the discussion below of FIGS. 6 and 7, RTP is relied upon for endpoint-to-endpoint media transfer. Moreover, the IWF 100 may collect statistics on media flow for a particular call between endpoints 125, 150. The parameters for collection of statistics should permit the definition of peak calling times for various media. The collection and maintenance of statistical data for various media can provide flow statistics so that the combined networks 160 and 170 may maintain at least a minimum quality of service (QOS).

The IWF 100 also must support fast connect procedures. For example, the IWF 100 shall support the fastStart element.

Also, the IWF 100 must support H.245 tunneling, for example for more efficient call set-up. To this end, the IWF 100 shall support the H.245 tunneling in a Setup message.

Moreover, an IWF 100 must support pregranted Admission Request (ARQ). The IWF 100 shall support the pregranted ARQ by accomplishing address resolution from the H.323 GK 200 using location request (LRQ) and location confirm (LCF) message exchange.

Also, the IWF 100 shall support overlapped sending of digits, for example, the overlapped sending of dialed digits.

The IWF 100 shall support early versions of H.245, if at all possible.

Now data transport will be discussed in some detail. Firstly, certain assumptions will be made for underlying networks 160 and 170. The underlying network should support both the TCP and UDP, i.e. both reliable and non-reliable delivery of messages is supported. The networks 160 and 170 of a given H.323 and SIP system can be geographically anywhere. There are no assumptions for the closeness of these networks to one another. The underlying network is not assuring levels of quality of service (QOS) beyond a minimum. There is no priority of signaling messages over other messages.

The transport requirements for interworking include an assumption that both H.323 network 160 and SIP network 170 use RTP for carrying media. If this is not the case, then a media gateway will be required, which may not be desirable, between endpoints. The transport should support for large fan-out to multiple endpoints.

The IWF 100 must support mapping between SIP and H.323 messages. In general, a clearer mapping between SIP and H.323 messages shall be provided which reflects similar command meanings in call process sequence. The call message sequence shall be maintained in both the directions of transmission of media. The IWF 100 shall not make any decision on its own related to basic functionality of a call, like call setup and call teardown, etc. Any H.323 or SIP messages, which do not have a match on the other side, should be terminated on the IWF 100, and IWF 100 should take the necessary action on resolving them. In case the IWF 100 is required to generate a message on its own toward the H.323 or the SIP side, IWF 100 should use pre-configured default values for the parameters.

The information elements of the respective messages of the H.323 and SIP protocols are to be converted as follows: a) The contents of connection specific information elements (such as Call Reference Value on H.323) shall be converted to respective information as required by SIP or SDP such as session identification (ID), call leg and Call-ID; b) Information elements that are not in use on the H.323 network 160 side of IWF 100 shall be generated by the IWF 100 as required by the SIP protocol and vice versa; c) The SIP data fields are converted into the corresponding Abstract Syntax Notation One (ASN.1) user-user information element structure. The user-user information element structure shall be generated according to the specification in Recommendation H.225.0 for middleware and H.245 (for opening and closing logical channels).

Now call signaling registration and admission (per H.225.0) and SIP call signaling will be discussed. The IWF 100 shall conform to the call signaling procedures recommended for the SIP network 170 side independent from the H.323 network 160 side, and the IWF 100 shall also conform to the call signaling procedures recommended for the H.323 network 160 side independent from the SIP side.

The IWF 100 shall terminate the Q.931 Call Signaling Channel between an H.323 endpoint 125 or H.323 Gatekeeper 200 (in case of H.323 GK routed signaling) and the IWF 100 on the one hand and the call signaling (if any) between the IWF 100 and the SIP endpoint 150 on the other SIP network 170 side. The IWF 100 shall terminate the Registration, Admissions and Status (RAS) Channel between an H.323 Gatekeeper 200 (if any) and IWF 100.

The IWF 100 supports messages for supplementary services (FACILITY, NOTIFY, and the INFORMATION messages) on the H.323 network side by processing such messages at the IWF 100, but only if the associated service is supported.

The IWF 100 should support H.323 Call Control (H.245) and SIP Call Control (SDP) and, to that end, IWF 100 should try to map the H.245 and SDP to the maximum extent.

The IWF 100 shall also support H.323 audio/video codec to SIP media formats. To this end, the IWF 100 should provide invisible support for all audio/video algorithms supported by either ITU or IANA and may handle dynamic payload types.

The call sequence should be maintained in such a way on both sides of IWF 100 so that neither H.323 terminal nor SIP UA is aware of the presence or existence of an IWF 100. The IWF 100 should provide seamless interworking between the call flows of the two protocols. The IWF 100 should limit any modifications to the normal call flows of either protocol. The messages and parameters which do not have direct mapping on the other side are to be generated by the IWF 100 with default parameters in most of the cases. In brief, the H.323 endpoint 125 should not be aware of the fact that it is calling an SIP endpoint 150 and vice versa.

The definition of a state machine for IWF 100 will now be described. A state machine for IWF 100 will follow the following general guidelines: a) Unexpected messages in a particular state are treated as "Error" messages; b) All messages which do not change the state are treated as "Non triggering or Informational" messages; c) All messages which expect a change in state are treated as "Triggering" messages.

To this end, for each state, for example, busy and idle states among other states defined in the state machine, there should be guidelines that classify all possible messages into the above three categories. Apart from this, it is required to specify the processing i.e. action to be taken in the state machine on the contents of the message. Triggering messages expecting a change in state will result in showing the next state in the state machine table.

This classification of messages will result in a table provided below as an illustration. In the table, note that for a triggering message/event such as a registration message, an action "Add registration information" is defined and the next state "WaitForSetup is defined while for, for example, a non-triggering message such as a Q.931 message, this information is not shown. Similarly, an "error" message such as an H.245 message has no action or next state defined.

| State: Idle | | | |
| --- | --- | --- | --- |
| Possible Messages | Message Category | Action | Next state |
| All RAS Msg. | Triggering | Add Reg.Info. | WaitForSetup |
| All Q.931 Msg. | Non Triggering | | |
| All H.245 Msg. | Error | | |
| All Msg. From SIP side | Triggering | | |

The IWF 100 should additional support security requirements which may be stricter on the H.323 side than on the SIP side.

In call sequencing, there are assumptions that can be made for the endpoints 125, 150: 1) All endpoints trying to use IWF 100 are authorized with respective H.323 Gatekeeper 200 and SIP server 300 if one or the other or both are present in their respective networks 160 and 170; 2) All endpoints trying to make a call using IWF 100 are respectively admitted to do so from H.323 Gatekeeper 200 and SIP server 300 if present in their respective networks 160, 170.

The IWF 100 shall be required to provide procedures for preventing denial of service security attacks and maintaining persistence data for authorized endpoints for future verifications.

The IWF ought to support simple call supplementary services like call forwarding, call hold and call transfer, conferencing, session change (re-invite, mode request), security: Authentication, Authorization and privacy, quality of service (QOS) signaling, network management and redundancy.

Figure 6:
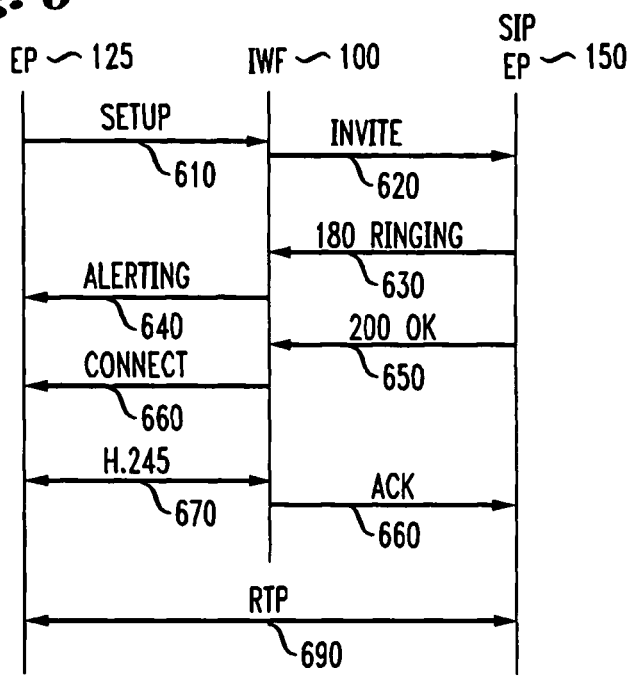
FIG. 6 is a communication processing chart which shows the steps that may be followed in establishing a simple communications session between an H.323 Endpoint and an SIP Endpoint.
Figure 7:
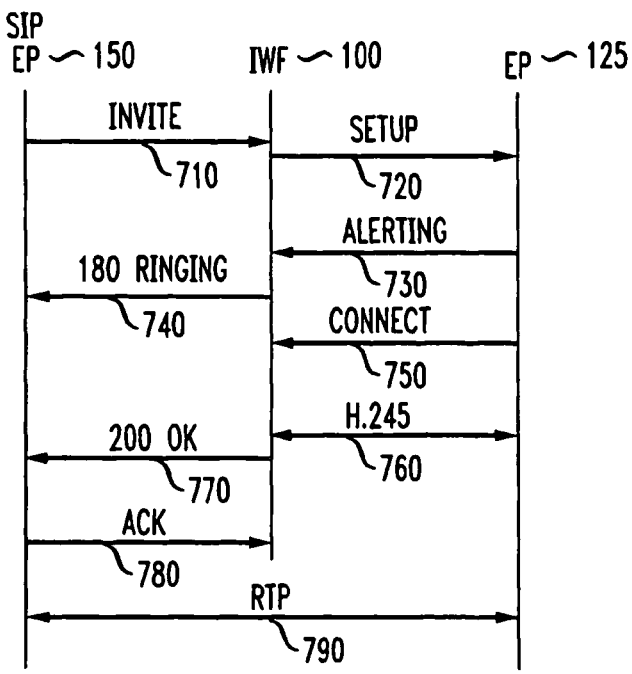
FIG. 7 is a communication processing chart which shows the steps that may be followed in establishing a simple communications session between an SIP Endpoint and an H.323 Endpoint.

Now, we will discuss some examples of call scenarios that will show primarily the input and output signaling messages of the IWF 100 for interworking between SIP and H.323 with reference to FIGS. 6 and 7. The important point is that the IWF 100 will perform the translation between the signaling messages of SIP and H.323. We will show what should be the output signaling message of the IWF 100 for a given input signaling message in the IWF 100.

In performing mapping of addresses and commands, the IWF 100 may have to face the following situations: a. It may so appear that there can be one-to-one mapping between the signaling messages and the IWF 100 will perform the translation accordingly; b. All parameters used in each signaling message one side may not match exactly to the corresponding signaling message of the other side. In this situation, some manipulations need to be done by the IWF 100 so that an agreed upon standard can be created based on common understanding although all parameters do not exactly match; c. For a given signaling message of a given protocol, there may not be a corresponding signaling message of the other protocol that may appear to be equivalent. The IWF 100 will create and maintain a mapping between the signaling messages or generate error messages based on common understanding of an agreed upon standard. These items a, b, and c as stated above are critical to creating an interoperability standard between H.323 and SIP. Some issues in those areas have already been addressed by Singh et al. in their document describing interworking between SIP/SDP and H.323: Singh/Schulzrinne, "Interworking Between SIP/SDP (Session Descriptive Protocol) and H.323", singh-sip-h323-00.txt, IETF, January 2000. However, we have addressed above and below, for example, the design of a state machine, the configurations for call scenarios and the input-output messages of the IWF 100 among other topics not addressed by Singh et al. that are required to provide interoperability between SIP and H.323.

The different call scenarios for the configurations of FIGS. 1-5 that we foresee are: a) Simple Call from H.323 terminal to SIP terminal; b) Call from H.323 terminal to SIP terminal using H.245 tunneling; c) Call from H.323 terminal to SIP terminal using early H.245; d) Call from H.323 terminal to SIP terminal using fast connect procedure; e) Call from H.323 terminal to SIP terminal using overlapped sending; f) Call from H.323 terminal to SIP terminal using pre granted ARQ (for configurations having H.323 GK 200); g) Simple call from SIP terminal to H.323 terminal; h) Call from SIP terminal to H.323 terminal using 11.245 tunneling; i) Call from SIP terminal to H.323 terminal using early H.245; j) Call from SIP terminal to H.323 terminal using fast connect procedure; k) Call from SIP terminal to H.323 terminal using overlapped sending; and 1) Call from SIP terminal to H.323 terminal using pre granted ARQ (for configuration having H.323 GK 200).

Referring to FIG. 6, a simple call from an H.323 terminal at endpoint 125 to an SIP terminal at endpoint 150 using the configuration of FIG. 1 involves the steps of: step 610, the H.323 endpoint 125 generating a Setup message to IWF 100 when IWF 100 must translate and identify the addressed endpoint 150; step 620, the IWF 100 generating an Invite message 620 to SIP endpoint 150; SIP Endpoint 150 in step 630 generating a 180 Ringing message to IWF 100 whereupon in step 640, IWF 100 transmits an Alerting message to H.323 endpoint 125. Also, SIP endpoint 150 transmits a 200 OK message to IWF 100 resulting in the IWF 100 transmitting a Connect message 660 to H.323 endpoint 125. Step 670 represents H.245 tunneling between H.323 endpoint 125 and IWF 100. Once the H.245 messaging is completed, IWF 100 sends an ACK message to SIP endpoint 150. Thereafter, the respective endpoints 125 and 150 communicate via RTP in step 690.

Referring to FIG. 7, a simple call from SIP terminal at endpoint 150 to an H.323 terminal at endpoint 125 using the configuration of FIG. 2 has the following call processing sequence. Initially, SIP endpoint 150 transmits an Invite message in step 710 which is received at IWF 100 that is responsible for translating and identifying addressed (or called) endpoint 125. IWF 100 in step 720 transmits a Setup message to H.323 endpoint 125. Then, H.323 endpoint 125 transmits an Alerting message to IWF 100 in step 730. Upon receipt of the alerting message, the IWF 100 generates a 180 Ringing message for transmission to SIP endpoint 150 in step 740. In step 750, H.323 endpoint 125 transmits a Connect message to IWF 100. In step 760, H.323 endpoint 125 and IWF 100 negotiate via H.245 tunneling. Once the negotiation is complete, IWF 100 transmits a 200 OK message to SIP endpoint 150 which replies with an ACK message to IWF 100 in step 780. Thereafter, the respective endpoints 125 and 150 communicate via RTP in step 790.

The following references should be deemed incorporated by reference as to any contents deemed necessary to an understanding of the present invention: M. Handley, H. Schulzrinne, E. Schooler, and J. Rosenberg, "SIP:Session Initiation Protocol", RFC 2543, IETF, March 1999; M. Handley and V. Jacobson, "SDP: Session Description Protocol", RFC 2327, IETF, April 1998; S. Bradner, "Key words for use in RFCs to indicate requirement levels", RFC 2119, IETF, March 1997; and "Packet based multimedia communication systems", Recommendation H.323, ITU-T, Geneva, Switzerland, February 1998.

Thus, there has been described a framework for H.323/SIP interworking which meets the objectives sought of a simple, efficient interworking mechanism. Other features and advantages of the present invention will be understood with reference to the claims below which should not be deemed to be limited to the specific disclosure of one embodiment of the present invention.

The invention claimed is:

1. A method of interworking for use in interworking between a first protocol based network and a second protocol based network, comprising:
   receiving, at an interworking gateway server serving the first and second protocol based networks, a request from a first endpoint in the first protocol based network, wherein receiving the request from the first endpoint in the first protocol based network comprises receiving the request from the first endpoint in the first protocol, wherein the first protocol based network is an H.323 protocol based network and the second protocol based network is a session initiation protocol based network;
   establishing a state machine in a memory of the interworking gateway server whereby, for each state of the state machine, a message associated with each state is categorized as one of a triggering message for a predetermined action, a non-triggering message and an error message, wherein establishing the state machine comprises establishing the state machine in the memory such that a registration message is the triggering message for the predetermined action and for an idle state of the state machine, wherein the registration message registers the interworking gateway server with the H.323 protocol based network and the session initiation protocol based network;

establishing a translation table in the memory whereby an address formatted in the first protocol has a corresponding address formatted in the second protocol;

processing the request based on the corresponding address in the translation table and processing the request based on the state machine;

permitting communication between the first endpoint and a second endpoint in the second protocol based network by utilizing a reliable transport protocol; and switching media traffic terminated at the interworking gateway server via a media switching fabric to the second endpoint.

2. The method of claim 1, further comprising switching any media terminated at the interworking gateway to an addressed endpoint.

3. The method of claim 1, further comprising establishing a waitforsetup state as a next state for the idle state.

4. The method of claim 1, further comprising establishing a predetermined maximum processing delay at the interworking gateway server.

5. The method of claim 1, further comprising imposing resource restrictions on the first endpoint in the first protocol based network or the second endpoint in the second protocol based network.

6. A method of interworking for use in interworking between a first protocol based network and a second protocol based network, comprising:

receiving, at an interworking gateway server serving the first and second protocol based networks, a request from a first endpoint in the first protocol based network, wherein the first protocol based network is an H.323 protocol based network and the second protocol based network is a session initiation protocol based network;

establishing a state machine in a memory of the interworking gateway server whereby, for each state of the state machine, a message associated with each state is categorized as one of a triggering message for a predetermined action, a non-triggering message, and an error message, wherein establishing the state machine comprises establishing the state machine in the memory such that a registration message is the triggering message for the predetermined action and for an idle state of the state machine, wherein the registration message registers the interworking gateway server with the H.323 protocol based network and the session initiation protocol based network;

establishing a translation table in the memory whereby an address formatted in the first protocol has a corresponding address formatted in the second protocol;

processing the request in accordance with the corresponding address in the translation table and the state machine;

permitting communication between the first endpoint and a second endpoint in the second protocol based network; and switching, via a media switching fabric, media traffic that has terminated at the interworking gateway server to the second endpoint by using the corresponding address.

7. The method of claim 6, further comprising establishing, a waitforsetup state as a next state for the idle state.

8. The method of claim 6, further comprising registering the interworking gateway server with a gatekeeper of the H.323 protocol based network.

9. The method of claim 6, further comprising registering the interworking gateway server with a session initiation protocol server of the session initiation protocol based network.

10. The method of claim 6, further comprising imposing resource restrictions on the first endpoint in the first protocol based network or the second endpoint in the second protocol based network.

11. The method of claim 6, further comprising establishing a predetermined recommended maximum processing delay at the interworking gateway server.

12. The method of claim 6, further comprising enabling the interworking gateway server to support H.245 tunneling.

13. The method of claim 6, further comprising collecting statistics associated with the media traffic for the first endpoint in the first protocol based network or the second endpoint in the second protocol based network.

14. The method of claim 13, further comprising maintaining quality of service based on the statistics associated with the media flow.

* * * * *